(12) United States Patent
Reinke et al.

(10) Patent No.: US 11,097,981 B2
(45) Date of Patent: *Aug. 24, 2021

(54) STEROL BLENDS AS AN ADDITIVE IN ASPHALT BINDER

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L. Baumgardner, Arkadelphia, AR (US); Andrew Hanz, La Crosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,978

(22) Filed: May 29, 2020

(65) Prior Publication Data

US 2020/0354274 A1 Nov. 12, 2020

Related U.S. Application Data

(63) Continuation of application No. 16/323,883, filed as application No. PCT/US2017/045887 on Aug. 8, 2017, now Pat. No. 10,669,202.

(Continued)

(51) Int. Cl.
*C08L 95/00* (2006.01)
*C04B 24/02* (2006.01)

(Continued)

(52) U.S. Cl.
CPC .............. *C04B 24/02* (2013.01); *C04B 18/02* (2013.01); *C04B 24/08* (2013.01); *C04B 24/36* (2013.01);

(Continued)

(58) Field of Classification Search
CPC ......... C04B 18/02; C04B 24/02; C04B 24/08; C04B 24/36; C04B 2111/0075;

(Continued)

(56) References Cited

U.S. PATENT DOCUMENTS 2,280,843 A  4/1942 Oliver et al.
2,286,244 A  6/1942 Whitacre (Continued)

FOREIGN PATENT DOCUMENTS

CA  3026997 A1  12/2017
GB  575484 A  2/1946

(Continued)

OTHER PUBLICATIONS

Arnaud et al. (2009) "Digging into Asphaltenes", Analytical Chemistry, 87:38, downloaded from http://pubs.acs.Urg/cen/coverstory/87/8738cover.html, 7 pages.

(Continued)

*Primary Examiner* — Raymond W Addie
(74) *Attorney, Agent, or Firm* — Kagan Binder, PLLC

(57) ABSTRACT

Disclosed are asphalt binder compositions and methods for making such compositions with pure sterol:crude sterol blends. The sterol blends improve various rheological properties.

20 Claims, 5 Drawing Sheets

Related U.S. Application Data

(60) Provisional application No. 62/372,504, filed on Aug. 9, 2016.

(51) Int. Cl.

| | | |
|---|---|---|
| *C04B 26/26* | (2006.01) | |
| *C08L 91/00* | (2006.01) | |
| *C04B 18/02* | (2006.01) | |
| *C04B 24/08* | (2006.01) | |
| *C04B 24/36* | (2006.01) | |
| *E01C 19/00* | (2006.01) | |
| *E01C 19/02* | (2006.01) | |
| *C04B 111/00* | (2006.01) | |
| *C04B 111/20* | (2006.01) | |

(52) U.S. Cl.
CPC .............. *C04B 26/26* (2013.01); *C08L 91/00* (2013.01); *C08L 95/00* (2013.01); *E01C 19/002* (2013.01); *E01C 19/02* (2013.01); *C04B 2111/0075* (2013.01); *C04B 2111/20* (2013.01); *C08L 2207/22* (2013.01); *C08L 2555/34* (2013.01); *C08L 2555/64* (2013.01)

(58) Field of Classification Search
CPC ...... C04B 2111/20; C08L 91/00; C08L 95/00; C08L 2207/22; C08L 2555/34; C08L 2555/64; E01C 19/002; E01C 19/02
USPC ..................................................... 404/17, 72
See application file for complete search history.

(56) References Cited

U.S. PATENT DOCUMENTS

| | | | |
|---|---|---|---|
| 2,392,863 A | 1/1946 | Rudd | |
| 2,411,634 A | 11/1946 | Pearson | |
| 2,585,336 A | 2/1952 | McCoy | |
| 2,715,638 A | 8/1955 | Albrecht et al. | |
| 2,793,138 A | 5/1957 | Wilkinson et al. | |
| 2,860,067 A | 11/1958 | Crews et al. | |
| 3,032,507 A | 5/1962 | Wright | |
| 3,691,211 A | 9/1972 | Julian | |
| 3,926,936 A | 12/1975 | Lehtinen | |
| 3,951,676 A | 4/1976 | Elste, Jr. | |
| 4,044,031 A * | 8/1977 | Johansson ................... C07J 9/00 | 552/545 |
| 4,874,432 A * | 10/1989 | Kriech ..................... C08L 95/00 | 106/273.1 |
| 5,437,717 A | 8/1995 | Doyle et al. | |
| 5,473,000 A * | 12/1995 | Pinomaa ................. C08L 95/00 | 524/59 |
| 5,496,400 A * | 3/1996 | Doyle ..................... C08L 95/00 | 106/220 |
| 6,057,462 A | 5/2000 | Robinson et al. | |
| 6,770,127 B2 * | 8/2004 | Kriech ..................... C08L 91/00 | 106/219 |
| 6,987,207 B1 | 1/2006 | Ronyak | |
| 7,448,825 B2 | 11/2008 | Kasahara et al. | |
| 7,575,767 B2 | 8/2009 | May et al. | |
| 7,811,372 B2 | 10/2010 | Nigen-Chaidron et al. | |
| 8,696,806 B2 * | 4/2014 | Williams .................. C08H 8/00 | 106/273.1 |
| 8,741,052 B2 * | 6/2014 | Naidoo ..................... C08K 5/17 | 106/273.1 |
| 9,481,794 B2 | 11/2016 | Cox | |
| 10,030,145 B2 | 7/2018 | Severance et al. | |
| 10,669,202 B2 | 6/2020 | Reinke et al. | |
| 10,793,720 B2 | 10/2020 | Puchalski et al. | |
| 2003/0087789 A1 | 5/2003 | Scheffler | |
| 2003/0144536 A1 | 7/2003 | Sonnier et al. | |
| 2007/0151480 A1 * | 7/2007 | Bloom ....................... C11C 3/12 | 106/220 |
| 2010/0170417 A1 | 7/2010 | Naidoo et al. | |
| 2010/0305342 A1 | 12/2010 | Wong et al. | |
| 2010/0319577 A1 | 12/2010 | Naidoo et al. | |
| 2012/0060722 A1 * | 3/2012 | Montpeyroux ......... C04B 26/26 | 106/235 |
| 2014/0234027 A1 * | 8/2014 | Morris ..................... C08L 33/08 | 404/75 |
| 2014/0338565 A1 * | 11/2014 | Severance ............... C08L 95/00 | 106/234 |
| 2015/0087753 A1 * | 3/2015 | Koleas .................... C08L 95/00 | 524/71 |
| 2015/0329702 A1 | 11/2015 | Hwang et al. | |
| 2016/0122507 A1 | 5/2016 | Cox | |
| 2016/0160453 A1 | 6/2016 | Donelson | |
| 2016/0362338 A1 | 12/2016 | Reinke et al. | |
| 2018/0209102 A1 * | 7/2018 | Baumgardner ....... C08L 95/005 | |
| 2018/0215919 A1 * | 8/2018 | Reinke ................. E01C 11/005 | |
| 2019/0152850 A1 * | 5/2019 | Warner ................ C09J 191/005 | |
| 2019/0153229 A1 * | 5/2019 | Reinke ................... A61K 31/56 | |
| 2019/0265221 A1 * | 8/2019 | Reinke ................... C04B 18/16 | |
| 2020/0207944 A1 * | 7/2020 | Reinke .................... C08L 95/00 | |
| 2020/0277497 A1 | 9/2020 | Reinke et al. | |

FOREIGN PATENT DOCUMENTS

| | | |
|---|---|---|
| JP | 2005-154465 A | 6/2005 |
| JP | 2012-093108 A | 5/2012 |
| WO | 2004/016336 A1 | 2/2004 |
| WO | 2010/110651 A1 | 9/2010 |
| WO | 2013/090283 A1 | 6/2013 |
| WO | 2013/163463 A1 | 10/2013 |
| WO | 2014/047462 A1 | 3/2014 |
| WO | 2015/070180 A1 | 5/2015 |
| WO | 2016/073442 A1 | 5/2016 |
| WO | 2017/027096 A2 | 2/2017 |
| WO | 2017/213692 A1 | 12/2017 |
| WO | 2017/213693 A1 | 12/2017 |
| WO | 2018/031540 A1 | 2/2018 |
| WO | 2018/144731 A1 | 8/2018 |
| WO | 2019/023172 A1 | 1/2019 |

OTHER PUBLICATIONS

ASTM D6521-13 (2013) "Standard practice for accelerated aging of asphalt binder using a pressurized aging vessel (PAV)", ASTM International, 6 pages.

Zaumanis et al. (2014) "Evaluation of different recycling agents for restoring aged asphalt binder and performance of 100 % recycled asphalt", Materials and Structures, 48(8):2475-2488.

"B-Sitosterol from Soybeans" downloaded from http://www.mpbio.com/product.php?pid=02102886, May 21, 2015, 2 pages.

B-Sitosterol Powder, Supplier: MP Biomedicals, Printed from VWR Website, Date: Jun. 9, 2016, 1 page.

Cantrill, Richard (2008) "Phytosterols, phytostanols and their esters, Chemical and Technical Assessment", 69th JECFA, 13 pages.

Fini et al. (2010) "Characterization and application of manure-based bio-binder in asphalt industry", Transportation Research Board 89th Annual Meeting, 14 pages.

Fini et al. (2011) "Chemical characterization of biobinder from swine manure: sustainable modifier for asphalt binder"Journal of Materials in Civil Engineering, 23(11):1506-1513.

Fini et al. (2012) "Application of swine manure in development of bio-adhesive" Allen D. Leman Swine Conference, p. 244.

"Product Data Sheet from MP Biomedicals Website", Catalog No. 102886, beta-Sitosterol, 2015, 1 page.

"Wood Chemistry PSE 406/Chem E 470, Lecture 13, Diterpenes and Triterpenes", Wood Chemistry, 5 pages, 2015.

International Search Report and Written Opinion for International Application No. PCT/US2016/064961, dated Apr. 5, 2017, 23 pages.

International Search Report and Written Opinion for International Application No. PCT/US2017/045887, dated Dec. 8, 2017, 14 pages.

Kriz et al. (2007) "Glass transition and phase stability in asphalt binders", Road Materials and Pavements Design, 30 pages.

Material Safety Data Sheet (Aug. 8, 2013) "T—Sylfat™ DP8", Arizona Chemical Company LLC, 7 pages.

(56) References Cited

OTHER PUBLICATIONS

Material Safety Data Sheet, Catalog No. 102886, Revision date: Apr. 26, 2006, Product Name: beta-Sitosterol Practical Grade, 5 pages.
Mogawer et al. (2012) "Performance characteristics of high rap bio-modified asphalt mixtures", Transportation Research Board 91st Annual Meeting, 16 pages.
Allen et al. (2013) "Microstructural Characterization of the Chemo-Mechanical Behavior of Asphalt in Terms of Aging and Fatigue Performance Properties", UMI Dissertation Publishing, Proquest LLC., 24 pages.
Reinke et al. 2017 "Investigation of sterol chemistry to retard the aging of asphalt binders", Transportation Research Record., 2633(1):127-135.
"Sylvaroad™ RP 1000 Performance Additive", Safety Data Sheet, Arizona Chemical Company LLC, 7 pages, Apr. 1, 2015.
"Tallex Pitch", Ingevity Holdings SPRL, Safety Data Sheet,12 pages, Jul. 21, 2017.
Verleyen et al. (2002) "Influence of the vegetable oil refining process on free and esterified sterols", Journal of the American Oil Chemists' Society, 79:947-953.
Wakefield, Amma (Aug. 15, 2018) "ATc: A Parameter to Monitor asphalt binder's kryptonite" Asphalt, 33(2):24-27.
Endo, Yasushi (1990) "Minor Components in Edible Fats and Oils" Oil Chemistry, 39(9):611-617 (English Abstract on p. 611).
Anonymous, (2016),"The Use of REOB/VTAE in Asphalt (IS-235)", Asphalt Institute, pp. 1-92, Retrieved from the ntemet: URL:http://www.asphaltinstitute.org/wp-content/uploads/IS235 Reob Vtae Asphaltinstitute.pdf (retrieved on: Mar. 20, 2017).
Anonymous, (2001), "Standard Method of Test for Determining the Flexural Creep Stiffness of Asphalt Mixtures Using the Bending Beam Rheometer (BBR); ASTM D 6648-01", pp. 1-22, Retrieved from the Internet: http://www.eng. auburn.edu/research/centers/ncat/rap/files/meetings/05-10/aashto-draft-specs.pdf.
Holmbom, B et al., (1978), "Compostion of Tall Oil Pitch", Journal of the American Oil Chemist's Society, vol. 55, pp. 342-344.
Martin et al., (2015), "The Effects of Recycling Agents on Asphalt Mixtures with High RAS and RAP Binder Ratios Project N 9-58)", National Cooperative Highway Research Program Transportation Research Board of The National Academics, pp. 1-184.
E.E. McSweeney et al., (Jan. 1, 1987)"Composition of Crude Tall Oil & Fractionation Products {Chapter 2)" in "Tall Dil and Its Uses-I", Pulp Chemicals Association, pp. 12-19.
Dverney et al., (1992),"Friction Measurement on Phase-Separated Thin Films with a Modified Atomic Force Microscope", Nature, 359, pp. 133-135.
Reinke et al., (2015), "Further Investigations Into the Impact of REOB & Paraffinic Oils on the Performance of Bitiminous Mixtures", Binder ETG Meeting, Fall River, MA, pp. 1-92.
Rowe, (2015), "Asphalt Modification", 56th Illinois Bituminous Paving Conference, pp. 1-42, Champaign, Illinois, USA.
Rowe, (2016), "[DeltajTc]—Some Thoughts on the Historical Development," Binder ETG Meeting, pp. 1-43.
Sui et al., (2010), "New Technique for Measuring Low-Temperature Properties of Asphalt Binders with Small Amounts of Material", Transportation Research Record, vol. 2179,Transportation Research Board, Washington, DC, pp. 23-28.
Takano et al., (1999), "Chemical and Biochemical Analysis Using Scanning Force Microscopy", Chemical Reviews, vol. 99, No. 10, 1, pp. 2845-2890.
Verleyen et al., (2002), "Analysis of Free and Esterified Sterols in Vegetable Oils," Journal of American Oil Chemists Society, vol. 79, No. 2, 7 pages.
Andrew Hanz et al., (2017), "Extended Aging of RAS Mixes with Rejuvenator," Binder expert Task Group Meeting, Aug. 10, 2016, pp. 1-41, retrieved from the internet: URL:https://www.asphaltpavement.org/PDFs/Engineering_ETGs/Binder_201609/06 Hanz Extened Aging of RAS Mixes with Rejuvenator.pdf., retrieved on Nov. 23, 2017.n.
Gerald Reinke et al., (2017), "Extended Aging of RAS Mixes with Rejuvenator (An Update)", Binder Expert Task Group Meeting, May 4, 2017, retrieved from the internet: URL:https://www.asphaltpavement.org/PDFs/Engineering_ETGs/Binder_201705/12_ Reinke&Hanz_UpdateExtendedAgingofRAS.pdf, retrieved on Nov. 23, 2017, pp. 17-19.
Changpin Sui et al., (2011), "New Low-Temperature Performance-Grading Method: Using 4-mm Parallel Plates on a Dynamic Sher Rheometer," Transportation Research Record, vol. 2207, pp. 43-48.
Roland Verhe et al. (2002), "Influence of the Vegetable Oil Refining Process on Free and Esterified Sterols," Journal of the American Oil Chemists' Society, 8 pages.
Roland Verhe et al., (2002), "Analysis of Free and Esterified Sterols in Vergetable Oils," Journal of the American Oil Chemists' Society, 7 pages.
Feng Yan et al., (2011), "Recovery of Phytosterols from Waste Residue of Soybean Oil Deodorizer Distillate", Soybean-Applications and Technology, 13 pages.
Syed Rubab et al., (2011), "Effects of Engine Oil Residues on Asphalt Cement Quality," Canadian Technical Asphalt Association Conference, 12 pages.

\* cited by examiner

STEROL BLENDS AS AN ADDITIVE IN ASPHALT BINDER

PRIORITY

This application is a continuation of U.S. patent application Ser. No. 16/323,883, filed Feb. 7, 2019, which claims priority to International Application No. PCT/US2017/045887, filed on Aug. 8, 2017, which claims the benefit of U.S. Provisional Patent Application Ser. No. 62/372,504, filed Aug. 9, 2016, the entire disclosures of which are incorporated by reference for all purposes.

BACKGROUND

Asphalt pavement is one of the most recycled materials in the world, finding uses when recycled in shoulders of paved surfaces and bridge abutments, as a gravel substitute on unpaved roads, and as a replacement for virgin aggregate and binder in new asphalt pavement. Typically, use of recycled asphalt pavement h limited to sub-surface pavement layers or to controlled amounts in asphalt base and surface layers. Such uses are limited in part because asphalt deteriorates with time, loses its flexibility, becomes oxidized and brittle, and tends to crack, particularly under stress or at low temperatures. These effects are primarily due to aging of the organic components of the asphalt e.g., the bitumen-containing binder, particularly upon exposure to weather. The aged binder is also highly viscous. Consequently, reclaimed asphalt pavement has different properties than virgin asphalt and must be processed in such fashion that the properties of the aged binder don't impact long term performance.

To reduce or retard the impact of asphalt aging on the long-range performance of mixtures, numerous materials have been investigated. For example, rejuvenators are marketed with a stated goal of reversing the aging that has taken place in recycled raw materials such as reclaimed asphalt pavement (RAP) and/or reclaimed asphalt shingles (RAS). It is unlikely that rejuvenation of asphalt can actually occur and foe more likely scenario is that these additives may instead serve as softening agents for the virgin binders employed in mixtures containing RAP and/or RAS. In some instances, 10% or more by weight of these softening agents are added to foe virgin binder when such mixtures are produced.

Aging can be assessed by measuring $\Delta Tc$, the difference between the Stiffness critical temperature and the creep critical temperature after aging. The use of softening agents can produce a mixture with recovered binder properties that have acceptable values of $\Delta Tc$ after extended mixture aging, but these acceptable binder properties after aging come at the cost of producing a mix that can be quite low in stiffness during the pavement's early life.

SUMMARY

Disclosed are compositions and methods that may retard, reduce or otherwise improve the effects of aging in recycled or reclaimed asphalt to preserve or retain some or all of the original virgin asphalt binder properties.

In one embodiment, the present disclosure provides a method for retarding the aging of or restoring aged asphalt binder comprising:

adding a pure sterol:crude sterol blend to an asphalt binder composition, wherein the asphalt binder composition comprises a virgin asphalt binder, aged asphalt binder or both, and wherein the sterol blend comprises a 10:90 to 90:10 weight ratio of pure sterol to crude sterol.

In one embodiment, the present disclosure provides a method for reusing aged asphalt for asphalt binder pavement production, comprising adding a pure sterol:crude sterol blend to an asphalt binder composition, wherein the asphalt binder composition comprises a virgin asphalt binder, aged asphalt binder or both, and wherein the sterol blend comprises a 10:90 to 90:10 weight ratio of pure sterol to crude sterol.

In another embodiment, the present disclosure provides an asphalt binder paving composition comprising virgin asphalt binder, aged asphalt binder, or both and a pure sterol:crude sterol blend, wherein the sterol blend comprises a 10:90 to 90:10 weight ratio of pure sterol to crude sterol.

In still other embodiments, the present disclosure provides a method for restoring aged asphalt binder comprising adding a pure sterol:crude sterol blend to a reclaimed asphalt binder, wherein the sterol blend comprises a 10:90 to 90:10 weight ratio of pure sterol to crude sterol.

DETAILED DESCRIPTION

Figure 1:
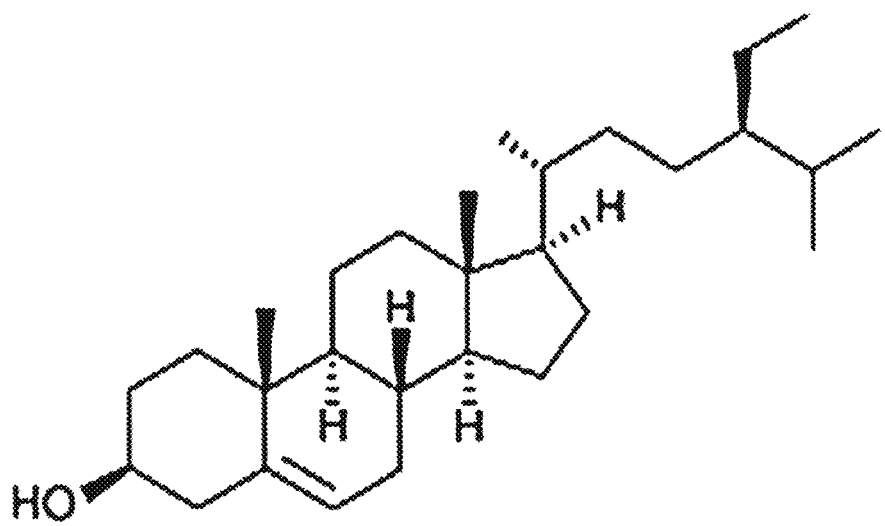
FIG. 1 depicts a representative plant sterol structure e.g., beta-sitosterol.
Figure 2:
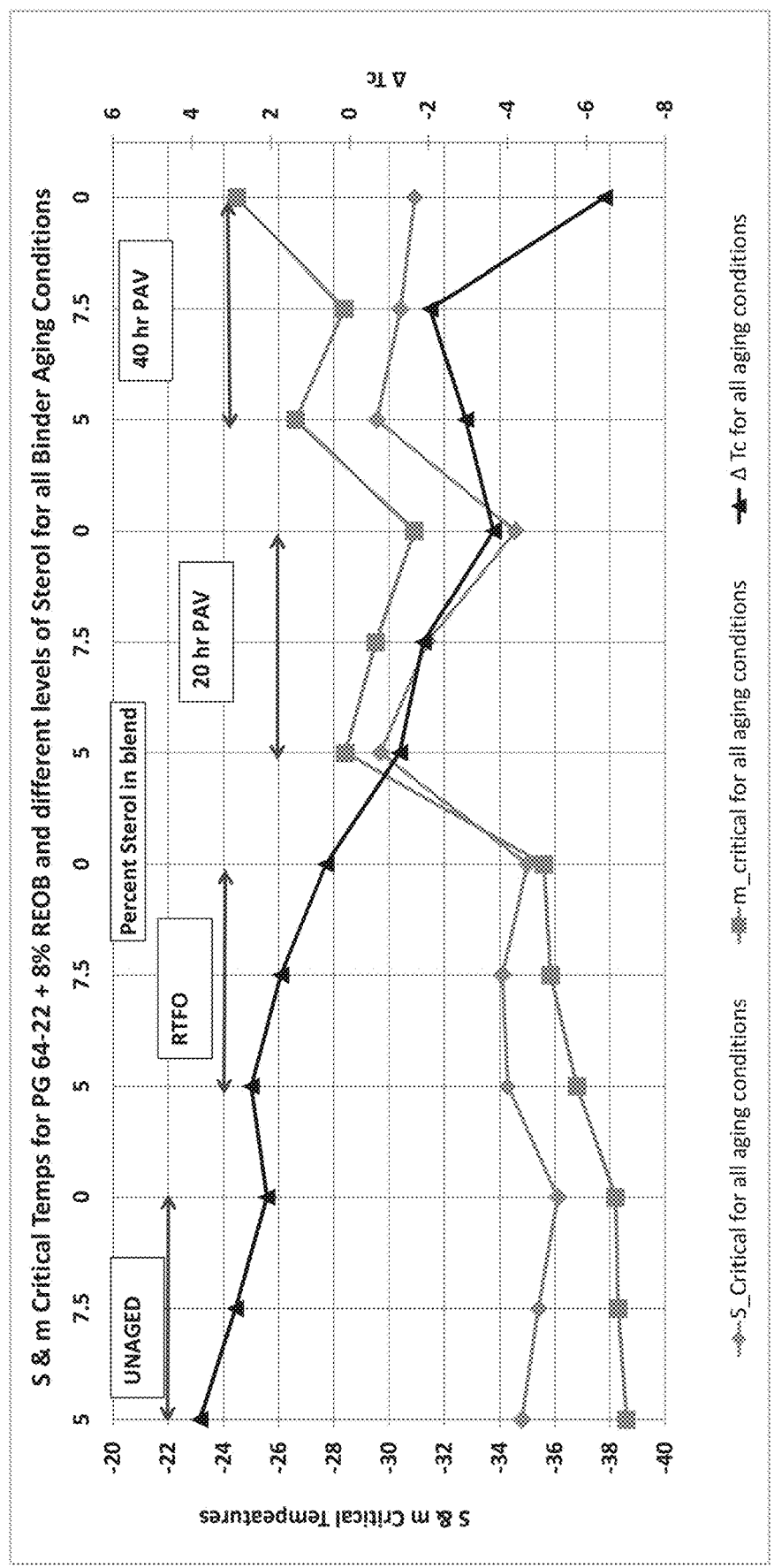
FIG. 2 is a graphical representation showing stiffness and creep temperature results for Re-refined Engine Oil Bottoms (REOB) blends with sterols.
Figure 3:
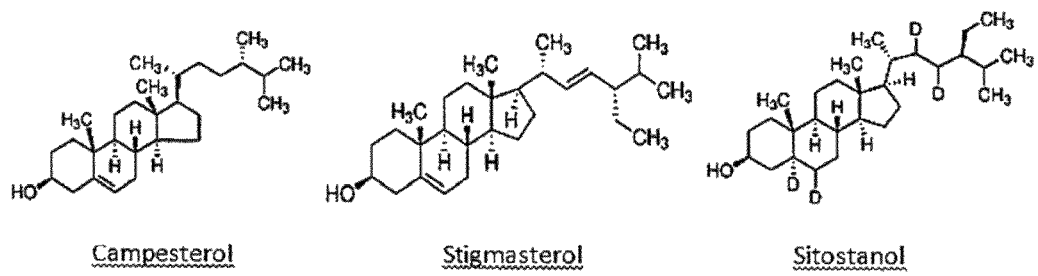
FIG. 3 shows exemplary plant sterols.

The disclosed asphalt compositions contain anti aging (viz., age reducing or age retarding) sterol blends that help in the preservation, recycling and reuse of asphalt compositions. The asphalt compositions preferably are free of cyclic organic compositions that contain esters or ester blends. The disclosed compositions have particular value for the renewal of reclaimed asphalt, especially asphalt containing softening agents such as waste engine oils.

The disclosed asphalt compositions provide recycled asphalt binders which may have improved physical and rheological characteristics such as stiffness, effective temperature range, and low temperature properties. Some embodiments provide for the use of binder extracted from recycled asphalt pavement, recycled asphalt shingles or both in asphalt blends. Some embodiments provide for the addition of a sterol blend to minimize potential detrimental low-temperature effects of recycled asphalt while allowing for higher stiffness at high temperatures.

Headings are provided herein solely for ease of reading and should not be interpreted as limiting.

Abbreviations, Acronyms & Definitions

"Aged asphalt binder" refers to asphalt or binder that is present in or is recovered from reclaimed asphalt. Aged binder has high viscosity compared with that of virgin asphalt or virgin bitumen as a result of aging and exposure to outdoor weather. The term "aged binder" also refers to virgin asphalt or virgin binder that has been aged using the laboratory aging test methods described herein (e.g. RTFO and PAV). "Aged hinder" may also refer to hard, poor-quality, or out-of-specification virgin binders that could benefit from addition of the disclosed blend particularly virgin binders having a ring-and-ball softening point greater than 65° C. by EN 1427 and a penetration value at 25° C. by EN 1426 less than or equal to 12 dmm.

"Aggregate" and "construction aggregate" refer to particulate mineral material such as limestone, granite, trap rock, gravel, crushed gravel sand, crushed stone, crushed rock and slag useful in paving and pavement applications.

"Asphalt binder" refers to a binder material including bitumen and optionally other components that is suitable for mixing with aggregate to make a paving mix. Depending on local usage, the term "bitumen" may be used interchangeably with or in place of the term "asphalt" or "binder".

"Asphalt pavement" refers to a compacted mixture of asphalt and aggregate.

"Asphalt paving mixture", "asphalt mix" and "mix" refer to an uncompacted mixture of asphalt and aggregate. Depending on local usage, the terms "bitumen mix" or "bituminous mixture" may be used interchangeably with or in place of the terms "asphalt paving mixture", "asphalt mix" or "mix".

Bitumen" refers to a class of black or dark-colored (solid, semisolid, or viscous) cementitious substances, natural or manufactured, composed principally of high molecular weight hydrocarbons, of which asphalts, tars, pitches, and asphaltenes are typical.

"Crude" when used with respect to a material containing a sterol or mixture of sterols means sterol that has not been fully refined and can contain components in addition to sterol.

"Neat" or "Virgin" binders are binders not yet used in or recycled from asphalt pavement or asphalt shingles, and can include Performance Grade binders.

"PAV" refers to a Pressurised Aging Vessel test. The PAV test simulates accelerated aging of asphalt using a pressurized aging vessel as described in ASTM D6521-13, Standard Practice for Accelerated Aging of Asphalt Binder Using a Pressurized Aging Vessel (PAV).

"Pure" when used with respect to a sterol or mixture of sterols means having at least a technical grade of purity or at least a reagent grade of purity.

"Reclaimed asphalt" and "recycled asphalt" refer to RAP, HAS, and reclaimed asphalt from old pavements, shingle manufacturing scrap, roofing felt, and other products or applications.

"Reclaimed asphalt pavement" and "RAP" refer to asphalt that has been removed or excavated from a previously used road or pavement or other similar structure, and processed for reuse by any of a variety of well-known methods, including milling, ripping, breaking, crushing, or pulverizing.

"Reclaimed asphalt shingles" and "RAS" refer to shingles from sources including roof tear-off, manufacture's waste asphalt shingles and post-consumer waste.

"RTFO" refers to a Rolling Thin Film Oven Test. This is a test used for simulating the short-term aging of asphalt binders as described in ASTM 02872-12e1, Standard Test Method for Effect of Heat and Air on a Moving Film of Asphalt (Rolling Thin-Film Oven Test).

"Softening agent" refers to additives that ease (or facilitate) the mixing and incorporation of a recycled asphalt into fresh bitumen or into an asphalt mix, during an asphalt mix production process.

"Sterol Wend" refers to a composition, mixture or blend of pure sterols and crude sterols that can be combined with aged binder (e.g. recycled or reclaimed asphalt) to retard the rate of aging of asphalt binder, or to restore or renew rite aged binder to provide some or all of the original properties of virgin asphalt or virgin binder.

"ΔTc" refers to the difference between the stiffness critical temperature and the creep critical temperature. The stiffness critical temperature is the temperature at which a binder tested according to ASTM D6648 has a flexural creep stiffness value of 300 MPa and the creep critical temperature is the temperature at which the slope of the flexural creep stiffness versus creep time according to ASTM D6648 has an absolute value of 0.300. Alternatively the stiffness and creep critical temperatures can be determined from a 4 mm dynamic shear rheometer (DSR) test and analysis procedures described by Sui, C., Farrar, M., Tuminello, W., Turner. T., *A New Technique for Measuring low-temperature Properties of Asphalt Binders with Small Amounts of Material, Transportation Research Record: No* 1681, *TRB* 2010. See also Sui, C., Farrar. M. J., Harnsberger, P. M., Tuminello, W. H., Turner, T. F., *New Low Temperature Performance Grading Method Using* 4 *mm Parallel Plates on a Dynamic Shear Rheometer*. TRB Preprint CD, 2011, where rite stiffness critical temperature b the temperature where the relaxation modulus equals 143 MPa and the creep critical temperature is where the absolute value of the slope of rite relaxation modulus master curve versus relaxation time equals 0.275.

All weights, parts and percentages are based on weight unless otherwise specified.

Binders

Current bituminous paving practices involve the use of high percentages of RAP and/or RAS as components in the bituminous mixtures being paved. Typically RAP concentrations can be as high as 50% and RAS concentrations can be as high as 6% by weight of the paving mixture. The typical bitumen content of RAP is in the range of 5-6% by weight and the typical bitumen content of RAS is in the range of 20-25% by weight. Consequently, a bituminous mixture containing 50% by weight of RAH will contain 2.5% to 3% RAP bitumen contributed to the final bituminous mixture and a bituminous mixture containing 6% RAS by weight wilt contain 12% to 1.5% RAS bitumen contributed to the final bituminous mixture. In many instances RAP and/or RAS are combined in bituminous mixtures; for example 20% to 30% RAP and 5% to 6% RAS can be incorporated into a bituminous mixture. Based on rite typical the asphalt binder contents of RAP and/or RAS, asphalt binders containing 20% to 30% RAP aid 5% to 6% RAS can result in 2% binder coming from the RAP and RAS combination to as much as 33% binder being derived from the RAP and RAS combination. Since a typical bituminous paving mixture will contain about 5.5% total bitumen there can be about 36% to as much as 60% of the total bitumen in the bituminous mixture from these recycled sources.

Characteristics of bitumen in these reclaimed sources relative to virgin binders used in bituminous mixtures are shown in Table 1. To determine the ΔTc parameter, a 4 mm dynamic shear rheometer (DSR) test procedure and data analysis methodology from the Western Research Institute was employed (see Sui, C., Farrar, M., Tuminello, W., Turner, T., *A New Technique for Measuring low-temperature Properties of Asphalt Binders with Small Amounts of Material, Transportation Research Record: No* 1681, *TRB* 2010. See also Sui, C., Farrar, M. J., Harnsberger, P. M., Tuminello, W. H., Turner, T. F., *New Low Temperature Performance Grading Method Using* 4 *mm Parallel Plates on a Dynamic Shear Rheometer*. TRB Preprint CD, 2011.

TABLE 1

| Bitumen type & source | High temperature stiffness grade, °C. | Critical Low temperature grade based on 4 mm DSR Stiffness, °C., 20 hr. PAV | Critical Low temperature grade based on 4 mm DSR Creep, °C. 20 hr. PAV | Critical low temperature stiffness grade subtracted from creep grade, ΔTc° C., 20 hr. PAV | Critical Low temperature grade based on 4 mm DSR Stiffness, °C., 40 hr. PAV | Critical Low temperature grade based on 4 mm DSR Creep, °C. 40 hr. PAV | Critical low temperature stiffness grade subtracted from creep grade, ΔTc° C., 40 hr. PAV |
|---|---|---|---|---|---|---|---|
| PG 58-28 | 60.3 | −31.4 | −30.9 | −0.5 | −30.7 | −27.8 | −2.9 |
| PG 64-22 | 67.1 | −27.1 | −26.2 | −.9 | −25.8 | −23.2 | −2.6 |
| Binder recovered from RAP | | Critical Low temperature stiffness grade based on 4 mm DSR | Critical Low temperature creep grade based on 4 mm DSR | Critical low temperature stiffness grade subtracted from creep grade, ΔTc° C. | | | |
| RAP 03-16-15-D | 85.0 | −25.5 | −22.3 | −3.2 | | | |
| RAP 02-23-15-B | 89.5 | −25.3 | −21.3 | −4.0 | | | |
| RAP 03-24-15-D | 98.8 | −22.4 | −17.1 | −5.3 | | | |
| RAP 02-09-15-B | 87.5 | −27.8 | −26.2 | −1.6 | | | |
| RAS 04-03-15-D | 158.2 | −27.5 | −0.3 | −27.2 | | | |
| RAS 02-09-15-C | 137.7 | −25.7 | +9.7 | −35.4 | | | |

Table 2 shows the high and low temperature properties of blends produced with virgin binder and bitumen recovered from post-consumer waste shingles after different periods of aging. Also shown in Table 2 are high and low temperature properties of mixtures containing RAP anchor RAS. Some of these mixtures have undergone extended laboratory aging and some are from field cores.

TABLE 2

| Binder recovered from RAP or RAS containing mixtures either lab or field aged | High temperature grade | Critical Low temperature stiffness grade based on 4 mm DSR | Critical Low temperature creep grade based on 4 nun DSR | Critical low temperature stiffness grade subtracted from creep grade. ΔTc° C. |
|---|---|---|---|---|
| Field mix 09-27-13-F PG 58-28 + 5% RAS, unaged | 83.1 | −32.3 | −30.6 | −1.7 |
| Field mix 09-27-13-E PG 58-28 + 5% MS, 5 day aged @ 85° C. | 102.8 | −28.5 | −23.9 | −4.6 |
| US Hwy 14 PG 58-28 + 6% RAS & 11% RAP, 10 day aged @ 85° C. | 85.4 | −30.9 | −24.1 | −6.8 |
| US Hwy 14 PG 52-34 + 6% RAS & 11% RAP, 10 day aged @ 85° C. | 80.8 | −35.6 | −29.9 | −5.7 |
| US Hwy 14 PG 58-28 + 31% RAP, 10 day aged @ 85° C. | 79.5 | −29.6 | −26.7 | −2.9 |
| Core from field paved 2011, cored 2013, binder from top ½ inch of core (mix contained PG 58-28 + 5% RAS or 22% shingle binder replacement) | 87.6 | −25.9 | −21.7 | −4.2 |
| Core from field paved 2011, cored 2013, binder from second ½ inch of core (mix contained PG 58-28 + 5% RAS or 22% shingle binder replacement) | 86.0 | −25.6 | −21.9 | −3.8 |
| Core from field paved 2011, cored 2013, binder from layer 2 inches below surface (mix contained PG 58-28 + 5% RAS or 22% shingle binder replacement) | 80.7 | −26.0 | −24.2 | −1.8 |

Tables 1 and 2 show the impact of incorporating high binder replacement levels of recycled materials, especially those derived from post-consumer waste shingles. The data demonstrate the desirability of incorporating additives into bitumen and bituminous mixtures to mitigate the impact of the bitumen from these recycled components and retard further oxidative aging of the total bitumen in the final mixture. The last three rows of Table 2 show that the further away from the air-mixture interface, tire lower the impact on ΔTc parameter. This parameter may be used to assess the impact of aging on hinder properties and more specifically the impact of aging on tire relaxation properties of the binder; the relaxation property is characterized by the property referred to as "low temperature creep grade".

Research published in 2011 showed, based on recovered binder data from field cores, that ΔTc could be used to identify when a pavement reached a point where there was a danger of non-load related mixture cracking and also when potential failure limit had been reached. In that research the authors subtracted the stiffness-critical temperature from the creep or m-critical temperature and therefore binders with poor performance properties had calculated ΔTc values that were positive. Since 2011 industry researchers have agreed to reverse the order of subtraction and therefore when the m-critical temperature is subtracted from the stiffness critical temperature binders exhibiting poor performance properties calculate to ΔTc values that are negative. The industry generally agreed that to have poor performing binders become more negative as performance decreased seemed more intuitive. Therefore, today in the industry and as used in the application, a ΔTc warning limit value is −3° C., and a potential failure value is −5° C. In ether words, −5° C. is more negative than −3° C. and therefore a ΔTc value of −5° C. is worse than a ΔTc value of −3° C.

Reports at two Federal Highway Administration Expert Task Group meetings have shown a correlation between ΔTc values of binders recovered from field test projects and severity of pavement distress related to fatigue cracking. Additionally, it has been shown that when binders used to construct these field test projects were subjected to 40 hours of PAV aging, the ΔTc values showed a correlation to pavement distress related to fatigue cracking, especially top down fatigue cracking which is generally considered to result from loss of binder relaxation at the bituminous mixture surface.

It is therefore desirable to obtain bituminous mixtures with bitumen materials that have a reduced susceptibility to the development of excessively negative ΔTc values.

The data in Table 1 show typical virgin binders produced at refineries can maintain a ΔTc of greater than −3° C. after 40 hours of PAV aging. Further, the data in Table 1 show that binder recovered from RAP can have ΔTc values of less than −4° C., and that the impact of high RAP levels in new bituminous mixtures should be evaluated. Further, the extremely negative values of ΔTc for RAS recovered binders require additional scrutiny as to the overall impact of RAS incorporation into bituminous mixtures.

Table 2 shows that it is possible to age bituminous mixtures under laboratory aging followed by recovery of the binder from the mixtures and determination of the recovered binder ΔTc. The long term aging protocol for bituminous mixtures in AASHTO R30 specifies compacted mix aging for five days at 85° C. Some research studies have extended the aging time to ten days to investigate the impact of more severe aging. Recently, aging loose bituminous mixes at 135° C. for 12 and 24 hours and in some instances for even greater time periods have been presented as alternatives to compacted mix aging. The goal of those aging protocols is to produce rapid binder aging similar to field aging representative of more than five years in service and more desirably eight to 10 years in service. For example, it has been shown for mixtures in service for around eight years that the ΔTc of the reclaimed or recycled asphalt from the top ½ inch of pavement was more severe than 12 hours aging at 133° C. but less severe than 24 hours aging at 135° C.

The data in the first two rows of Table 2 show why long-term aging of mixtures containing recycled products is important. The binder recovered from the unaged mix (row 1) exhibited a ΔTc of −1.7° C., whereas the binder recovered from the 5 day aged mix exhibited a ΔTc of −4.6° C.

Pure Sterol:Crude Sterol Blends

The disclosed sterol blends (pure sterol:crude sterol) can alter (e.g., reduce or retard) an asphalt binder aging rate, or can remote or renew an aged or recycled binder to provide some or ail of the properties of a virgin asphalt binder. For example, the sterol blends can alter or improve physical and rheological characteristics such as stiffness, effective temperature range, and low tempera-tire properties of the asphalt binder.

In some embodiments, the sterol blend belongs to the class of triterpenoids, and in particular to sterols or stanols. The disclosed blends (e.g. triterpenoids) can effectively work with asphaltenes. Asphaltenes include extensive condensed ring systems with some level of unsaturation. The asphaltene content of typical binders can range from less than 10% to more than 20%. Asphaltenes are typically described as materials that are insoluble in n-heptane. An exact structure is unknown and based on the performance behavior of different binders it is unlikely that the asphaltene structure in any two binders is the same, especially those front different crude sources. Asphaltenes give a banter its color and stiffness and they increase in content as the binder ages. Consequently, the addition of RAP and/or RAS causes the asphaltene content to increase. Increasing asphaltene content along with other product of oxidation such as carbonyls and sulfoxides are responsible for the stiffening of bituminous mixtures and their ultimate failure. By their very chemical nature asphaltenes are not readily soluble in aliphatic chemicals. Aromatic hydrocarbons will readily dissolve asphaltenes and aromatic process oils have been used in recycled mixtures. However these oils may contain poly nuclear aromatic compounds including listed potential carcinogens and therefore are not desirable additives Most plant based oils are straight or branched chain hydrocarbons with some level of unsaturation and therefore are not as effective at retarding aging as they are at softening the overall hinders in a mixture.

Triterpenoids are a major group of plant natural products that include sterols, triterpene saponins, and related structures. Triterpenoids can be of natural or synthetic origin. Typically they are obtained by extraction from plant material. Extraction processes for the isolation of triterpenoids are described e.g. in the international applications WO 01/72315 A1 and WO 20001/016336 A1, the disclosures of which are each incorporated here by reference in their entirety.

The triterpenoids include plant sterols and plant stanols. The disclosed triterpenoids refer to the non-esterified forms of any of the plant sterols mentioned herein.

Exemplary pure plant sterols include campesterol, stigasterol, stigmasterol, β-sitosterol, Δ5-avenosterol, Δ7-stigasterol, Δ7-avenosterol, brassicasterol or mixtures thereof. In some embodiments, the sterol blend contains β-sitosterol as the pure sterol. In other embodiments, live sterol blend contains a mixture of pure sterols. Commercially available pure sterols and mixtures of pore sterols includes those available from MP Biomedicals (Catalog No. 02102886) referred to as beta-Sitosterol (beta-Sitosterol ~40-60%; campesterol ~20-40%; Stigmasterol ~5%). In some embodiments, a pure sterol can have at least 70 wt. % sterols, and in some embodiments can have at least 80 wt %, at least 85 wt % or at least 95 wt % sterols.

Exemplary crude plant sterols include modified or unmodified natural products containing significant quantities of sterols, including such diverse plant sources as corn oil, wheat germ oil, sarsaparilla root, soybean pitch and corn oil pitch. For example, tall oil pitch is obtained dicing the process of preparing paper from wood, particularly pine wood. Tall oil pitch is an extremely complex material that cm contain rosins, fatty acids, oxidation products and esterified materials, an appreciable fraction of which are sterol esters Plant sources of erode sterols are inexpensive in that they are the foots or tailings left from various manufacturing processes In some embodiment, the erode sterol sources include stigmasterol, β-sitosterol, campesterol, ergosterol, brassicasterol, cholesterol and lanosterol or mixtures thereof. In some embodiments, the crude sterol sources include soy bean oil, corn oil, rice bran oil, peanut oil, sunflower seed oil, safflower oil, cottonseed oil, rapeseed oil, coffee seed oil wheat germ oil, tail oil, and wool grease. In some embodiments the crude sterol includes a bio-derived source or partially distilled residue of the bio-derived source. In some embodiments, the erode sterol source includes tall oil pitch, soybean oil or corn oil.

Any of lire oil tailings or pitches from the disclosed plant sources are suitable crude sterol sources. U.S. Pat. No. 2,715,638, Aug. 16, 1955, to Albrecht, discloses a process for recovering sterols from tail oil pitch whereby the fatty acid impurities are removed by a neutralization process. Following this, the sterol esters are saponified; the free sterols are then recovered and washed with isopropanol and dried. If sufficiently purified, the recovered free sterols may be used as pure sterols rather than as crude sterols in the disclosed pure sterol:crude sterol blends.

The crude sterols preferably are obtained from plant sources. The erode sterol can include components in addition to the desired sterol or sterols. Exemplary plant sources for crude sterols include tall oil pitch, crude tail oil, sugar cone oil, hot well skimmings, cottonseed pitch, soybean pitch, corn oil pitch wheat germ oil or rye germ oil. In some embodiments, tall oil pitch is a source of the erode sterol. Tall oil pitch can include about 30 to 40% unsaponifiable molecules. Unsaponifiables are molecules that do not react with alkali hydroxides. Fatty and rosin acids remaining is the tall oil pitch readily react with potassium or sodium hydroxides and thus the unsaponifiables can be readily separated. It has been shown that 45% of the unsaponifiable fraction can include sitosterols. Therefore, a tall oil pitch sample can contain approximately 13.5% to 18% sterol molecules by weight. In some embodiments the crude sterol can have less than a food grade of purity (e.g., less than 85 wt. % sterols) or containing more than 85 wt % sterols but also containing impurities or contaminants that render the material unsuitable for use in foods.

In some embodiments, the erode sterol may be animal derived such as cholesterol.

The pure sterol:crude sterol blend added to the asphalt composition may for example range from about 0.5 to about 15 wt %, or about 1 to about 10 wt. %, about 1 to about 3 wt. % of the virgin binder in an asphalt composition. The sterol blends can in some embodiments include a 10:90 to 90:10 ratio of pure sterol to crude sterol. The sterol blends can in some embodiments include at least a 20:80, 30:70 or 40:60 ratio of pure sterol to crude sterol, and in some embodiments can include less than an 80:20, 70:30 or 60:40 ratio of pure sterol to erode sterol.

In some embodiments, pore sterol:crude sterol blend can alter, reduce or retard the degradation of rheological properties in binder containing recycled bituminous materials that include softening agents such as RAS, RAP, REOB, virgin paraffin or naphthenic base oils, untreated or non-refined waste drain oils or waste engine oil materials, vacuum tower asphalt extenders, paraffinic or naphthenic processing oils or lubricating base oils. In some embodiments, the sterol blend when used in an asphalt or asphalt pavement maintains a ΔTc value greater than or equal to −5° C. as the asphalt or asphalt pavement is aged.

In some embodiments, the pure sterol:crude sterol blends can provide an asphalt binder composition with a ΔTc of greater than or equal to −5.0° C. In some embodiments, the sterol blends can provide art asphalt binder with a ΔTc of greater than or equal to −5.0° C. after 40 hours of PAV aging. In still other embodiments, the disclosed sterol blend can provide an asphalt binder with a less negative ΔTc value and a decreased R-Value following aging, when compared to a similarly-aged asphalt binder without the sterol blend.

Softening Agents & Other Additives

Softening agents that may be used in binders include waste engine oil and waste engine oil that may be further processed to provide REOB. REOB is a low cost softening additive and asphalt extender obtained from the residual material remaining after the distillation of waste engine oil either under vacuum or at atmospheric pressure conditions. The distilled fraction from the rerefining process is reprocessed into new lubricating oil for vehicles, but the bottoms do not have an available market due to the presence of metals and other particulates from internal combustion engines. Also these bottoms contain paraffinic hydrocarbons and additives incorporated into the original lubricating oil. For many years REOB were used by some companies as an asphalt extender, hut the usage was localized.

Greater amounts of waste engine oils are being produced and sold as REOB into the asphalt binder market. The use of REOB may provide mixtures, which when aged, have ΔTc values of −4° C. or lower with consequent poor performance in pavements. When REOB are added to some asphalts at levels as low as 5% by weight, the resulting ΔTc after 40 hr. PAV aging can be −5° C. or lower (viz., more negative). Recovered binders from field mixes shown to contain REOB by means of metals testing have shown greater distress than field mixtures of the same age and the same aggregate and paved at the same lime but not containing REOB.

The disclosed pure sterol:crude sterol blends can mitigate the impact of waste engine oils (e.g. REOB) on ΔTc (as evaluated, for example, using 40 hr. PAV) and renew or retard the aging rate of the recycled asphalt.

The disclosed sterol blend can also be used to mitigate the impact of other softening agents. These other softening agents include synthetic or virgin lubricating oils (such as MOBIL™ 1 synthetic oil from ExxonMobil Corp, and HAVOLINE™ 10W40 oil from Chevron USA Inc. h virgin paraffin or naphthenic base oils, untreated or non-rerefined waste drain oils or waste engine oil materials, vacuum tower asphalt extenders (the non-distillable fraction from re-re lining used engine oil) and paraffinic or naphthenic process oils.

The asphalt composition may contain oilier components in addition to the disclosed sterol blend. Such other components can include elastomers, non-bituminous binders, adhesion promoters, softening agents, rejuvenating agents and other suitable components.

Useful elastomers include, for example, ethylene-vinyl acetate copolymers, polybutadienes, ethylene-propylene copolymers, ethylene-propylene-diene terpolymers, reactive ethylene terpolymers (e.g. ELVALOY™), butadiene-styrene block copolymers, styrene-butadiene-styrene (SBS) block terpolymers, isoprene-styrene block copolymers and styrene-isoprene-styrene (SIS) block terpolymers, chloroprene polymers (e.g., neoprenes) and the like. Cured elastomer additives may include ground tire rubber materials.

Conventional rejuvenating agents are classified into types such as RA-1, RA-5, RA-25, and RA-75 as defined by ASTM D4552. Rejuvenating agents for use in the disclosed asphalt compositions may for example resemble the maltene fraction of asphalt such as an RA-1 rejuvenating agent, an RA-5 rejuvenating agent, or mixtures thereof. Exemplary rejuvenating agents are available from Holly Frontier under their HYDROLENE™ brand asphalt oils, from American Refining Group, Inc. under their KENDEX™ brand or from Tricor Refining, LLC under their Golden Bear Preservation Products RECLAMITE™ brand. Asphalt oils meeting ASTM standard D4552, and classified as RA-1 are suitable for harder asphalts, such as PG 64. RA-5, RA-25 and RA-75 oils may also be used with lower viscosity asphalts, such as PG 52. The rejuvenation agents can also include recycling agents that are rich in aromatics and resins, with small amounts of saturates.

The disclosed asphalt compositions can be characterized according to many standard tests such as those recited in applicable ASTM specifications and test methods. For example, the disclosed compositions can be characterized using rheological tests (viz., dynamic shear rheometer, rotational viscosity, and bending beam).

At low temperatures (e.g., −10° C.), road surfaces need cracking resistance. Under ambient conditions, stiffness and fatigue properties are important. At elevated temperatures, roads need to resist rutting when the asphalt becomes too soft. Criteria have been established by the asphalt industry to identify rheological properties of a binder that correlate with likely paved road surface performance over the three common sets of temperature conditions.

In one embodiment, the binder includes a blend of binders. In certain embodiments, the binder blend includes virgin binder and binder extracted front reclaimed asphalt. For example, the binder extracted from RAS material may be extracted from manufacturer asphalt shingle waste, from consumer asphalt shingle waste, or from a mixture of binders extracted from manufacturer and consumer asphalt shingle waste. In some embodiments, a binder blend may include virgin binder and recycled binder. The virgin binder can be from about 60 wt % to about 95 wt % of the binder blend and from about 2 wt % to about 100 wt % of reclaimed asphalt such as RAS. In certain embodiments, the binder blend includes the addition of a sterol blend from about 0.5 wt % to about 15.0 wt % of the virgin asphalt. In some embodiments, the binder blend can include the addition of from about 0.2 wt % to about 1.0 wt % pure sterol:crude sterol blend. The sterol blend has been shown to improve high and low temperature properties and PG grading for both low and high temperature ends of RAS-containing asphalt hinder blends.

The asphalt binder composition may be prepared by mixing or blending the pure sterol:crude sterol blend with the virgin binder to form n bituminous mixture or blend. The bituminous mixture or blend can be added to recycled asphalt (e.g., RAS and/or RAP) and aggregate. One of skill in the art will recognize that any sequences of adding and mixing components are possible.

Asphalt compositions can be prepared by applying mechanical or thermal convection. In one aspect, a method of preparing an asphalt composition involves mixing or blending a pure sterol:crude sterol blend with virgin asphalt at a temperature of from about 100° C. to about 250° C. in some embodiments, the sterol blend is mixed with the virgin asphalt at a temperature from about 125° C. to about 175° C., or 180° C. to 205° C. In some embodiments, the asphalt composition is mixed with asphalt, sterol blend and softening agent. In still other embodiments, the asphalt composition is mixed with asphalt, RAS, sterol blend and aggregate.

To determine the $\Delta Tc$ parameter, a 4 mm DSR tea procedure and data analysis methodology from the Western Research Institute was employed as noted above. The DSR test procedure and methodology are also disclosed in International Application No. PCT/US16/37077 filed Jun. 10, 2016 and in PCT/US2016/064950 filed Dec. 5, 2016 and PCT/US2016/064961 filed Dec. 5, 2016, each of which is incorporated herein by reference in its entirely.

The $\Delta Tc$ parameter can also be determined using a Bending Beam Rheometer (BBR) test procedure based on AASHTO T313 or ASTM D6648. It is important that when the BBR test procedure is used that the test is conducted at a sufficient number of temperatures such that results for the Stiffness failure criteria of 300 MPa and Creep or re-value failure criteria of 0.300 are obtained with one result being below the failure criteria and one result being above the failure criteria. In some instances for binders with $\Delta Tc$ values less than −5° C. this can require performing the BBR test at three or more test temperatures. $\Delta Tc$ values calculated from data when the BBR criteria requirements referred to above are not met may not be accurate.

Pavement surface characteristics and changes in them can be revealed in an asphalt composition. These surface characteristics can be determined using atomic force microscopy (AFM). AFM is described for example in R. M. Overney. E. Meyer, J. Frommer, D. Brodbeck, K, Lüthi, L. Howald, H.-J. Güntherodt, M. Fujihira, H. Takano, and Y. Gotoh, "*Friction Measurements on Phase Separated Thin Films with a Modified Atomic Force Microscope*", Nature, 1992, 359, 133-135; E. zer Muhlen and H. Niehus, "*Introduction to Atomic Force Microscopy and its Application to the Study of Lipid Nanoparticles*", Chapter 7 in *Particle and Surface Characterization Methods*, R. H. Muller and W. Mehnert Eds, Medpharm Scientific Pub, Stuttgart, 1997; and in H. Takano, J. R. Kenseth. S.-S. Wong, J. C. O'Brien, M. D. Porter, "*Chemical and Biochemical Analysis Using Scanning Force Microscopy*", Chemical Reviews 1999, 99, 2845-2890.

AFM is a type of scanning microscopy that provides high resolution, three-dimensional imaging at the atomic and molecular level. AFM can be used for both topographical imaging and force measurements. Topographical imaging involves scanning the cantilever/tip across the sample surface. A laser beam k reflected off the hack of the cantilever, and small changes in cantilever deflection are detected with a position-sensitive photodiode detector. This deflection is processed by the system electronics to determine topological height changes on the sample surface.

The surface defects may be measured as the surface roughness, expressed as average roughness over an image surface, based on the average height of the roughness extending out of the surface of the sample expressed in μm, and with the defect area (i.e. the non-smooth plane of the sample) expressed in µm² and as a percent of the image area (e.g., as a percent of a 400 µm² image area). AFM can be used to determine the effects of the sterol blends on an asphalt composition, and was used to determine the effects of pure sterols on asphalt compositions in the above-mentioned International Application No. PCT/US16/37077 and PCT/US2016/064950 filed Dec. 5, 2016 and PCT/US2016/064961 filed Dec. 5, 2016.

Binders can be prepared for AFM by application of a small bead to a steel stub. With a knife, the bead can be scraped against the surface of the stub and the resulting film heated to 115° C. for about 2 min to allow the film surface to level. AFM images can be captured at room temperature on a Bruker Dimension Icon-PT™ Scanning Probe microscope. Both topographic and friction images can be obtained after the asphalt films have been annealed 72 h to 96 h at room temperature. Antimony doped silicon cantilever tip AFM probes (Bruker Corporation) can be used for measurements. Topographic images can reveal vertical elevations and declinations associated to surface features, whereas the friction image allows for differentiation of surface material based on changes in elastic or adhesive properties.

In some embodiments, a method for identifying aging in an asphalt composition and slowing the aging or restoring the aged asphalt includes analyzing an asphalt composition for the presence or absence of surface defects, wherein the asphalt is determined as aging if minimal surface defects are detected; and adding a pure sterol:crude sterol blend and virgin binder to the aged asphalt binder composition to reduce or slow the aging. In some embodiments, the aged asphalt compositions include recycled asphalts, softening agents, and rejuvenating agents. For example, some asphalt compositions include RAS, RAP, REOB, virgin paraffinic or naphthenic base oil, untreated or non-rerefined waste drain oils or waste engine oil materials, vacuum tower asphalt extenders, paraffinic or naphthenic processing oils and lubricating base oils. In some embodiments, the average roughness of an asphalt composition with sterol blend is 1.5 to 350 µm from 3.6 to 232 µm, or from 10 to 230 µm.

The present application is further illustrated in the following non-limiting examples, in which all parts and percentages are by weight unless otherwise indicated.

Example 1

To investigate the efficacy of blends of crude sterol and pure sterol compared to only pure sterol on the aging properties of binders containing REOB, a PG 64-22 base asphalt was used. The various samples were aged for 20 and 40 hours in the PAV following ASTM D65217 and by RFTO following ASTM D2872.

Blends were produced by mixing the components with a low shear LIGHTNIN™ mixer from SPX Flow Corp. in a 1 gallon can at a temperature of 187.8° C.-204° C. (370-400° F.) for approximately 30 minutes.

The blend components included 92% of 64-22 binder, 8% REOB and various concentrations of sterols provided as blends of crude sterol in the form of tall oil pitch (obtained from Union Camp) and pure sterol (obtained from MP Biomedical).

It was assumed that the sterol in crude sterol sources such as tail oil pitch includes about 15% sterol. Therefore, the following samples would include expected sterol amounts as follow's:

1. 85% tall oil pitch+15% pure sterol; sterol amount is (0.85*15) from tall oil pitch+15 from pure sterol=27.7% expected sterol.
2. 60% tall oil pitch+40% pure sterol; sterol amount is (0.6*15) from tall oil pitch+40 from pure sterol=49% expected sterol.
3. 30% tall oil pitch+70% pure sterol; sterol amount is (0.3*15) from tall oil pitch+70 from pure sterol=74.5% expected sterol.

If 10% of each of the above blends were added to PG 64-22 containing 8% REOB, it would be expected that (based on the assumption of 15% sterol in the tall oil pitch) the blends would contain 2.8% sterol, 4.9% sterol and 7.4% sterol.

The results are shown below in Table 3.

TABLE 3

| Binder Aging | % REOB added to binder | % Tall oil Pitch and Pure Sterol blend added to binder | Ratio of tall oil pitch to Sterol TOP/Sterol | S-Critical Temp | m-Critical temp | ΔTc | Low temp PG Grade | High Temp PG Grade[1] |
|---|---|---|---|---|---|---|---|---|
| Unaged | 8 | 0 | 0/0 | −36.1 | −38.2 | 2.10 | −36.1 | 63.2 |
| Unaged | 8 | 10 | 85/15 | −38.20 | −39.26 | 1.06 | −38.2 | 56.4 |
| Unaged | 8 | 10 | 60/40 | −36.29 | −38.27 | 1.98 | −36.29 | 56.9 |
| Unaged | 8 | 10 | 30/70 | −34.20 | −37.51 | 3.30 | −34.20 | 57.0 |
| RTFO | 8 | 0 | 0/0 | −35 | −35.60 | 0.60 | −35.0 | 64.0 |
| RTFO | 8 | 10 | 85/15 | −35.666 | −36.394 | 0.73 | −35.67 | 57.1 |
| RTFO | 8 | 10 | 60/40 | −34.90 | −35.92 | 1.03 | −34.90 | 57.1 |
| RTFO | 8 | 10 | 30/70 | −33.05 | −35.55 | 2.49 | −33.05 | 57.3 |
| 20 hr. PAV | 8 | 0 | 0/0 | −34.56 | −30.92 | −3.64 | −30.92 | 82.5 |
| 20 hr. PAV | 8 | 10 | 85/15 | −33.045 | −31.231 | −1.81 | −31.23 | 75.1 |
| 20 hr. PAV | 8 | 10 | 60/40 | −32.32 | −30.46 | −1.86 | −30.46 | 75.2 |
| 20 hr. PAV | 8 | 10 | 30/70 | −30.52 | −29.65 | −0.87 | −29.65 | 74.3 |
| 40 hr. PAV | 8 | 0 | 0/0 | −30.94 | −24.48 | −6.46 | −24.48 | 95.1 |
| 40 hr. PAV | 8 | 10 | 85/15 | −32.345 | −27.681 | −4.66 | −27.681 | 83.2 |

TABLE 3-continued

| Binder Aging | % REOB added to binder | % Tall oil Pitch and Pure Sterol blend added to binder | Ratio of tall oil pitch to Sterol TOP/Sterol | S-Critical Temp | m-Critical temp | ΔTc | Low temp PG Grade | High Temp PG Grade[1] |
|---|---|---|---|---|---|---|---|---|
| 40 hr. PAV | 8 | 10 | 60/40 | −30.75 | −27.18 | −3.57 | −27.18 | 81.8 |
| 40 hr. PAV | 8 | 10 | 30/70 | −28.40 | −26.36 | −2.05 | −26.36 | 80.4 |
| 60 hr. PAV | 8 | 10 | 85/15 | −30.42 | −22.98 | −7.44 | −22.98 | 89.9 |
| 60 hr. PAV | 8 | 10 | 60/40 | −30.48 | −25.40 | −5.08 | −25.40 | 87.4 |
| 60 hr. PAV | 8 | 10 | 30/70 | −28.52 | −25.60 | −2.91 | −25.60 | 84.1 |

[1]For unaged binder the high temperature grade is where binder stiffness = 1 KPa, for RTFO the high temperature grade is where binder stiffness = 2.2 KPa, for PAV residues the high temperature grade is where the binder stiffness = 1 KPa.

Figure 4:
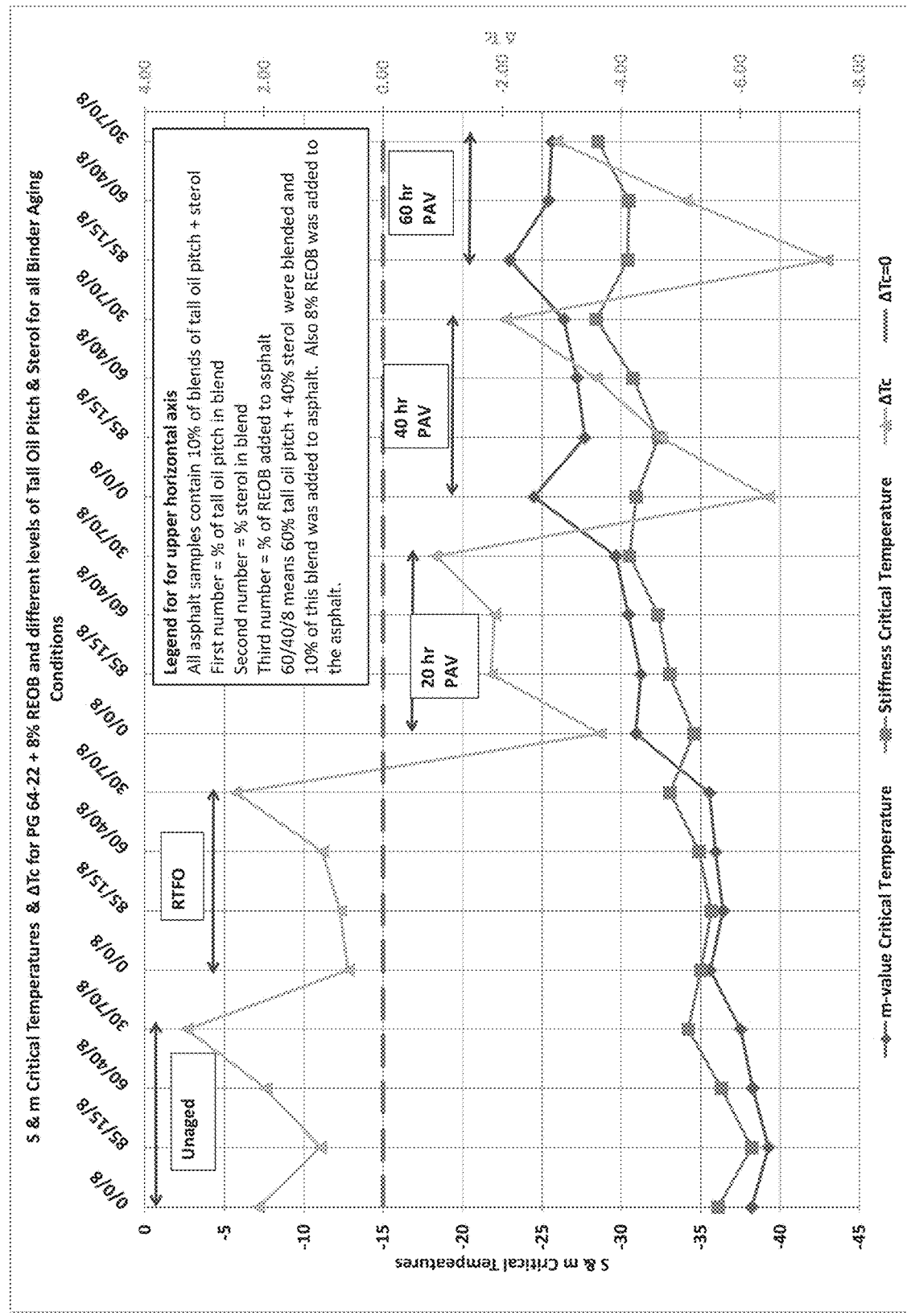
FIG. 4 is a graphical representation showing Stiffness, m-Value Critical Temperatures and $\Delta Tc$ for PG 64-22 with 8% REOB and 10% of blends of tall oil pitch and sterol at varying concentrations.

FIG. 4 is a plot of the data shown in Table 3 for the stiffness critical temperatures, m-value critical temperatures and ΔTc values. The data plotted in FIG. 4 shows that the blends of tall oil pitch and pure sterol improve the ΔTc values of the PG 64-22 with 8% REOB relative to the blend with no tall oil pitch and sterol. There appears to be a dose response of total sterol in the blends and general degrading of ΔTc as the binder aging progresses, however, higher levels of total sterol in the blend maintain acceptable ΔTc properties even after 60 hours of PAV aging.

Table 4 shows the independent effect of each tall oil pitch blended into asphalt; pure sterol blended into asphalt; and blends of tall oil pitch with pure sterol on 20 and 40 hour PAV aging on those blends in PG 64-22+8% REOB.

TABLE 4

| Binder Aging | % REOB | % Tall Oil Pitch[1] | % Sterol[2] | S_critical Temp | m_critical Temp | sΔTc | Low Temp PG Grade |
|---|---|---|---|---|---|---|---|
| 20 hr. PAV | 8 | 0 | 0 | −34.6 | −30.9 | −3.64 | −30.92 |
| 20 hr. PAV | 8 | 5 | 0 | −31.48 | −28.97 | −2.51 | −28.97 |
| 20 hr. PAV | 8 | 10 | 0 | −33.11 | −30.62 | −2.49 | −30.62 |
| 20 hr. PAV | 8 | 0 | 2.5 | −32.3 | −29.4 | −2.84 | −29.43 |
| 20 hr. PAV | 8 | 0 | 5 | −29.7 | −28.4 | −1.27 | −28.42 |
| 20 hr. PAV | 8 | 0 | 7.5 | −31.4 | −29.5 | −1.87 | −29.52 |
| 20 hr. PAV | 8 | 10% of 85/15 blend | 2.7 | −33.05 | −31.23 | −1.81 | −31.23 |
| 20 hr. PAV | 8 | 10% of 60/40 blend | 4.9 | −32.32 | −30.46 | −1.86 | −30.46 |
| 20 hr. PAV | 8 | 10% of 30/70 blend | 7.4 | −30.52 | −29.65 | −0.87 | −29.65 |
| 40 hr. PAV | 8 | 0 | 0 | −30.9 | −24.5 | −6.46 | −24.48 |
| 40 hr. PAV | 8 | 5 | 0 | −29.86 | −24.39 | −5.47 | −24.39 |
| 40 hr. PAV | 8 | 10 | 0 | −30.79 | −26.38 | −4.41 | −26.38 |
| 40 hr. PAV | 8 | 0 | 2.5 | −31.1 | −25.9 | −5.20 | −25.88 |
| 40 hr. PAV | 8 | 0 | 5 | −29.6 | −26.6 | −2.93 | −26.62 |
| 40 hr. PAV | 8 | 0 | 7.5 | −30.4 | −28.4 | −2.05 | −28.38 |
| 40 hr. PAV | 8 | 10% of 85/15 blend | 2.7 | −32.34 | −27.68 | −4.66 | −27.68 |
| 40 hr. PAV | 8 | 10% of 60/40 blend | 4.9 | −30.75 | −27.18 | −3.57 | −27.18 |
| 40 hr. PAV | 8 | 10% of 30/70 blend | 7.4 | −28.40 | −26.36 | −2.05 | −26.36 |

[1]10% of 85/15 refers to 10% addition of a blend of 85% tall oil pitch and 15% pure sterol by weight, 10% of 60/40 refers to 10% addition of a blend of 60% tall oil pitch and 40% pure sterol by weight, and 10% of 30/70 refers to 10% addition of a blend of 30% tall oil pitch and 70% pure sterol by weight.
[2]The sterol concentrations listed for the blends of tall oil pitch and pure sterol are estimates of total sterols based on the assumption that the tall oil pitch contains 15% sterol by weight.

Examination of the data in Table 4 shows for the 20 hour PAV residue that for the 5% and 10% tall oil blends and the 2.5% pure sterol composition the ΔTc values are similar and are approximately 1° C. warmer than for the 8% REOB blend in PG 64-22 with no other additive. This implies a minor impact of those blends on the degrading impact of the 8% REOB on the binder. The ΔTc data for the 20 hour PAV residues produced with the 10% dosage of tall oil pitch plus pure sterol showed results that are approximately 1° C. warmer than the tall oil only or the pure sterol only blends. For the 40 hour PAV residues the 5% anti 10% tall oil blends and the 2.5% pure sterol composition show similar results and all show ΔTc values that are 1-2° C. warmer than the 64-22+8% REOB blend. The 5% and 7.5% pure sterol blends have ΔTc values that are 3.5-4.5° C. warmer than the 64-22+REOB blend. At the 40 hour PAV the blends of tall oil pitch and pure sterol exhibit ΔTc properties similar to the pure sterol blends, indicating that it is possible to obtain outcomes similar to those achieved using the pure sterol by blending pure sterol with a bio derived oil or bio derived oil pitch residue containing less than pure sterol.

Figure 5:
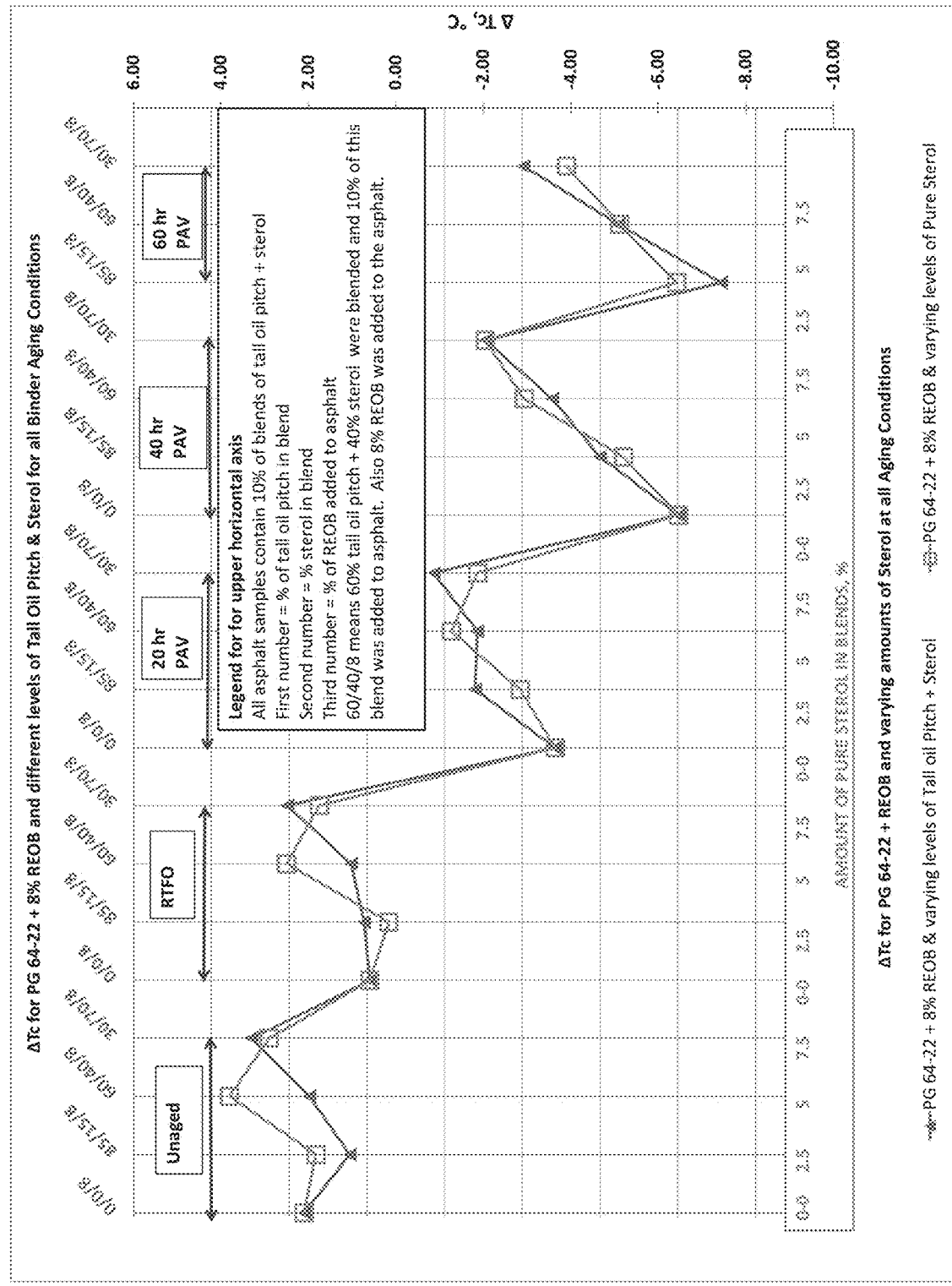
FIG. 5 is a graphical representation comparing $\Delta Tc$ for PG 64-22+8% REOB+three levels of pure sterol with PG 64-22+8% REOB.

FIG. 5 graphically shows this relationship between the ΔTc results for pure sterol and blends with tall oil pitch and pure sterol using the PG 64-22 base binder plus 8% REOB. FIG. 5 shows foe similarity in ΔTc behavior at 20, 40 and 60 hours of PAV aging for these two sets of materials. There is no 60 hour PAV data provided for the 64-22+8% REOB, but it is clear that the lowest dosage levels of sterol have ΔTc values at 60 hours that are comparable to the ΔTc results for the non-sterol blend at the 40 hour PAV level.

Example 2

To investigate the effects of pure sterol crude sterol blends on the aging properties of binders, 20 hour PAV aged RAPs were used. The 20 hour aged RAPs were each aged in the PAV (Pressured aging vessel) following ASTM D65217. The RAPs were blended with either 5% of a bio-oil from Cargill, MN (Cargill 1103) or with 5% of a pure sterol blend. Each RAP was tested before mixing with the various sterol blends.

Blends were produced by mixing the components in a 3 ounce tin can. The tin cans were covered and placed in a 60° C. (140° F.) oven overnight to allow for warming and mixing of the components. After the overnight warming, the samples were hand mixed and tested for high temperature stiffness properties with a 25 nm DSR test procedure and low temperature properties wore determined using the 4 mm DSR testing procedure. The results are reported in Table 5.

low temperature PC grade by 9.8° C. The ΔTc value was improved by 1.1° C. or 17.5% while the R-value was decreased by only 1.53%, indicating that the addition of the softening oil did little to improve the tow temperature relaxation properties of the RAP binder. The addition of the sterol reduced the high temperature grade by 5.9° C., and dropped the low temperature grade by 1.6° C., but the ΔTc value was increased by 3.2° C. or 72.3% while the R-value decreased by 15.35%. These comparative data indicate that the sterol addition is doing more than just softening the RAP.

The invention claimed is:

1. A method for retarding the aging of or restoring aged asphalt binder comprising:
   adding a pure sterol:crude sterol blend to an asphalt binder composition, wherein the asphalt binder composition comprises a virgin asphalt binder, aged asphalt binder or both, and wherein the sterol blend is 0.5-15 wt % of the asphalt binder composition and retards the aging rate of the asphalt binder composition compared to a similarly aged asphalt binder composition that does not include the sterol blend.

2. The method of claim 1, wherein the sterol blend comprises a 10:90 to 90:10 weight ratio of pure sterol to crude sterol.

3. The method of claim 1, wherein the crude sterol comprises a bio-derived source or distilled residue of the bio-derived source.

4. The method of claim 1, wherein the crude sterol comprises a tall oil pitch, soybean oil or corn oil.

5. The method of claim 1, wherein the sterol blend is 1 to 10 wt. % of the asphalt binder composition.

6. The method of claim 1, wherein the virgin binder is from 60 wt % to 95 wt % of the asphalt binder composition.

7. The method of claim 1, wherein the aged binder is 2 wt % to 100 wt % of the asphalt binder composition.

8. The method of claim 1, wherein the asphalt binder composition further comprises a softening agent.

9. The method of claim 8, wherein the softening agent further comprises bio-derived or petroleum-derived oil.

10. The method of claim 1, wherein the aged asphalt binder comprises asphalt binder from reclaimed asphalt shingles or reclaimed asphalt pavement.

11. The method of claim 1, wherein the sterol blend comprises an amount effective to provide a less negative ΔTc value and a decreased R-Value of an aged asphalt binder composition compared to a similarly-aged asphalt binder composition without the sterol blend.

TABLE 5

| Blend | HT PG | LT PG | ΔTc | % improvement in ΔTc | R-value | % improvement in R value |
|---|---|---|---|---|---|---|
| CTH N RAP PAV, original test | 85.6 | −21.2 | −5.4 | | 2.78 | |
| CTH N RAP PAV | 85.9 | −21.7 | −6.5 | | 2.77 | |
| Average of original and new test of untreated sample | 85.8 | −21.5 | −6.0 | | 2.78 | |
| CTH N RAP PAV + 5% Cargill 1103 | 76.2 | −31.3 | −4.9 | 17.5% | 2.73 | 1.53% |
| Plt 77 RAP PAV original test | 89.8 | −19.9 | −4.1 | | 2.61 | |
| Plt 77 RAP PAV | 91.2 | −18.0 | −4.7 | | 2.74 | |
| Average of original and new test of untreated sample | 90.5 | −19.0 | −4.4 | | 2.67 | |
| Plt 77 RAP PAV + 5% Sterols | 84.6 | −20.4 | −1.2 | 72.3% | 2.26 | 15.35% |

The results in Table 5 show the bio oil reduced the high temperature grade of the RAP by 9.6° C. and dropped the composition compared to a similarly-aged asphalt binder without the sterol blend.

12. The method of claim 1, further comprising mixing aggregate with the asphalt binder composition, applying the resulting mixture to a base surface, and compacting the applied mixture.

13. An asphalt binder composition comprising virgin binder, aged asphalt binder comprising reclaimed asphalt pavement (RAP), reclaimed asphalt shingles (RAS), or combinations of both, and a pure sterol:crude sterol blend, wherein the sterol blend is 0.5-15 wt % of the asphalt binder composition and retards the aging rate of the asphalt binder composition compared to a similarly aged asphalt binder composition that does not include the sterol blend.

14. The asphalt binder composition of claim 13, wherein the virgin binder can be from 60 wt % to 95 wt % of the asphalt binder composition.

15. The asphalt binder composition of claim 13, wherein aged binder can be 2 wt % to 100 wt. % of the asphalt binder composition.

16. The asphalt binder composition of claim 13, wherein the sterol blend comprises a 10:90 to 90:10 weight ratio of pure sterol to crude sterol.

17. The asphalt binder composition of claim 13, wherein the crude sterol comprises a bio-derived source or distilled residue of the bio-derived source.

18. The asphalt binder composition of claim 13, wherein the crude sterol comprises a tall oil pitch, soybean oil or corn oil.

19. The asphalt binder composition of claim 13, wherein the asphalt binder composition further comprises a softening agent.

20. The asphalt binder composition of claim 13, further comprising aggregate with the asphalt binder composition to result in a mixture that is applied and compacted to base surface.

* * * * *